(12) United States Patent
Lantigua (10) Patent No.: US 7,545,627 B1
(45) Date of Patent: Jun. 9, 2009

(54) LAPDESK DUAL INTERFACE PORTABLE-STATIONARY COMPUTER

(76) Inventor: Juan J. Lantigua, 1677 N. Gardiner Dr., Bay Shore, NY (US) 11706

( * ) Notice: Subject to any disclaimer, the term of this patent is extended or adjusted under 35 U.S.C. 154(b) by 0 days.

(21) Appl. No.: 11/944,609

(22) Filed: Nov. 24, 2007

(51) Int. Cl.
*G06F 1/16* (2006.01)

(52) U.S. Cl. .................. 361/679.04; 361/679.02; 248/917; 312/223.1; 312/223.2

(58) Field of Classification Search ......... 361/679–683; 312/223.1, 223.2; 248/917–924
See application file for complete search history.

(56) References Cited

U.S. PATENT DOCUMENTS

| | | | |
|---|---|---|---|
| 4,496,943 A | | 1/1985 | Greenblatt |
| 4,497,036 A | | 1/1985 | Dunn |
| 4,769,764 A | | 9/1988 | Levanon |
| 5,570,780 A | * | 11/1996 | Miller .................. 206/305 |
| 5,682,993 A | * | 11/1997 | Song .................... 206/320 |
| 5,796,577 A | | 8/1998 | Ouchi et al. |
| 5,871,094 A | * | 2/1999 | Leibowitz ............. 206/320 |
| 5,931,297 A | * | 8/1999 | Weill et al. ........... 206/320 |
| 6,028,764 A | * | 2/2000 | Richardson et al. ...... 361/681 |
| 6,128,186 A | * | 10/2000 | Feierbach ............ 361/683 |
| 6,266,241 B1 | | 7/2001 | Van Brocklin et al. |
| 6,411,288 B1 | | 6/2002 | Min |
| 6,532,146 B1 | | 3/2003 | Duquette |
| 6,593,859 B1 | * | 7/2003 | Watanabe ............. 341/20 |
| 6,665,176 B2 | * | 12/2003 | Amemiya et al. ........ 361/681 |
| 6,667,878 B2 | * | 12/2003 | Ponx ................ 361/683 |
| 6,781,823 B1 | * | 8/2004 | Nyack ............... 361/683 |
| 6,842,338 B2 | * | 1/2005 | Iredale .............. 361/683 |
| 6,989,987 B1 | * | 1/2006 | Wilson et al. ........ 361/681 |
| 7,061,472 B1 | * | 6/2006 | Schweizer et al. ...... 345/168 |
| 7,126,588 B2 | * | 10/2006 | Oakley ............. 345/169 |
| 7,136,282 B1 | * | 11/2006 | Rebeske ............ 361/683 |
| 7,339,783 B2 | * | 3/2008 | McEwan et al. ........ 361/683 |
| 2001/0000447 A1 | | 4/2001 | Thompson |
| 2002/0057552 A1 | * | 5/2002 | Dinkin .............. 361/683 |
| 2002/0122290 A1 | | 9/2002 | Davis, IV |
| 2002/0141146 A1 | * | 10/2002 | Mustoe ............. 361/683 |
| 2003/0142469 A1 | * | 7/2003 | Ponx ............... 361/683 |
| 2003/0218860 A1 | * | 11/2003 | Shiraiwa ............ 361/681 |
| 2004/0051679 A1 | * | 3/2004 | Ponx .............. 345/1.1 |
| 2004/0160736 A1 | * | 8/2004 | Lin ................ 361/683 |
| 2005/0057894 A1 | * | 3/2005 | Kim et al. ........... 361/683 |
| 2005/0137942 A1 | * | 6/2005 | LaFleur ............. 705/27 |
| 2005/0277872 A1 | * | 12/2005 | Colby et al. .......... 604/67 |
| 2006/0126284 A1 | * | 6/2006 | Moscovitch .......... 361/681 |
| 2006/0152898 A1 | * | 7/2006 | Hirayama ........... 361/683 |
| 2008/0062625 A1 | * | 3/2008 | Batio .............. 361/680 |

FOREIGN PATENT DOCUMENTS

| | | |
|---|---|---|
| WO | WO02/082213 | 10/2002 |
| WO | WO2005/119404 | 12/2005 |

\* cited by examiner

*Primary Examiner*—Jayprakash N Gandhi
*Assistant Examiner*—Anthony Q Edwards
(74) *Attorney, Agent, or Firm*—Michael I. Kroll (57) ABSTRACT

A portable computer having a plurality of viewable interfaces including a dual screen viewable from multiple and opposing vantages that is removable from the device and is freestanding utilizing a base element. Additionally the present invention has a touch screen capability and interface elements including but not limited to a keyboard, mouse, speakers, media ports, CD ports. Finally the present invention has an exterior metal structure and Teflon lined interior interface and components for incorporated biometric devices including finger printing and eye scan functions.

15 Claims, 13 Drawing Sheets

LAPDESK DUAL INTERFACE PORTABLE-STATIONARY COMPUTER

BACKGROUND OF THE INVENTION

1. Field of the Invention

The present invention relates generally to computers and, more specifically, to a portable computer having a dual interface comprising a detachable screen having both a first and second viewable sides that are adjustable both horizontally and vertically whereby the user may interact with one or both of the interfaces with any known communication means. The user of the present invention may interact with the present invention in a plurality of means including but not limited to biometric identification, finger printing, touch screens, and eye scans. Additionally the present invention is comprised of an exterior metal outer portion and an interior Teflon liner to protect and provide for the inventions durability. Finally the present invention may be constructed in a plurality of forms including a laptop and lapdesk configuration.

2. Description of the Prior Art

There are other computer devices designed for providing multiple displays Typical of these is U.S. Pat. No. 4,496,943 issued to Greenblatt on Jan. 29, 1985.

Another patent was issued to Dunn on Jan. 29, 1985 as U.S. Pat. No. 4,497,036. Yet another U.S. Pat. No. 4,769,764 was issued to Levanon on Sep. 6, 1988 and still yet another was issued on Aug. 18, 1998 to Ouchi et al as U.S. Pat. No. 5,796,577.

Another patent was issued to Van Brocklin et al on Jul. 24, 20010 as U.S. Pat. No. 6,266,241. Yet another U.S. Pat. No. 6,411,288 was issued to Min on Jun. 25, 288. Another was issued to Duquette on Mar. 11, 2003 as U.S. Pat. No. 6,532,146 and still yet another was issued on Dec. 23, 2003 to Ponx as U.S. Pat. No. 6,667,878.

Another patent was issued to Thompson on Apr. 26, 2001 as U.S. Patent No. 2001/0000447. Yet another U.S. Patent No. 2002/0122290 was issued to Davis IV on September 2002. Another was issued to Kiniko Industrial corporation on Oct. 17, 2002 as PCT. Patent No. WO02/082213 and still yet another was issued on Jun. 1, 2005 to Beech Technology Incorporated as U.S. Patent No. WO2005/119404.

U.S. Pat. No. 4,496,943

Inventor: Richard W. Greenblatt

Issued: Jan. 29, 1985

A portable information display system, corresponding generally to a computer "terminal", employs a compact embodiment of a size to fit under a typical airline seat. Subassemblies including a modem, a power supply, a cathode ray tube, a protocol convertor, and a keyboard are specifically arranged inside the housing to permit optimal operation in minimal volume.

U.S. Pat. No. 4,497,036

Inventor: James P. Dunn

Issued: Jan. 29, 1985

In the disclosed portable computer, a keyboard with keys for entering at least a full alphabet and ten digits is coupled to a computer system that includes a central processing unit which is in turn coupled to a display arrangement with a liquid crystal display. The entire computer is mounted in a case composed of a base and a cover hinged to the base. The base houses the computer system and the keyboard, and exposes the keyboard for operation by a user when the cover is open, while the cover houses the display arrangement and exposes the liquid crystal display on its inner surface. The cover is hinged at the edge of the base and, when closed, covers substantially the entire upper surface of the base.

U.S. Pat. No. 4,769,764

Inventor: Isaac Levanon

Issued: Sep. 6, 1988

A computer system comprises a generally U-shaped base unit (10) and a generally-rectangular travel unit (12) which mates with the base unit, between the legs (34, 36) of the "U". The portable unit contains a complete computer system, including a flip-up monitor screen (14), a disc drive (20), and a detachable keyboard (24). The mating base unit includes expansion slots (30) for additional memory, peripheral equipment controllers, a CRT controller, etc. Also the base unit includes a controller (112) for one or more additional disc drives (26, 28). The facing sides of the legs of the U-shaped base unit have a step-shaped configuration (42, 44, 46) and the portable unit fits onto the step. The bight portion (38) of the base unit has a front connector (49A) for mating with the portable unit and rear connectors (48, 58A) for connection of additional equipment, such as a printer and modem.

U.S. Pat. No. 5,796,577

Inventor: Genjiro Ouchi et al

Issued: Aug. 18, 1998

The notebook computer 1 comprises a keyboard 2 positioned on the upper surface of a computer body 10, an operating ball 22, function keys 24 and the like. A cover member fixed to the computer body 10 by a hinge 40 so that it opens and closes against the computer body is supported in an open position substantially perpendicular to the body 10. A first display device 60 is formed on the inner surface of the cover member 50, and a second display device 70 is formed on the outer surface thereof. The operator and the client facing each other with the notebook computer positioned between them could share the same screen information by watching each of the two display devices in front of them.

U.S. Pat. No. 6,266,241

Inventor: Van Brocklin et al

Issued: Jul. 24, 2001

A notebook computer has a base with a keyboard. A display is attached to the base. A stand having a first and second position is mounted to the base such that when the stand is in the first position the display is at a first height and when the stand is in the second position, the display is at a second height that is at least one inch higher than the first height.

U.S. Pat. No. 6,411,288

Inventor: Yoon-ki Min

Issued: Jun. 25, 2002

A flat panel display device including a panel unit for displaying an image, a main body unit controlling an image displayed on the panel unit, and a folder connecting the panel unit and the main body unit.

U.S. Pat. No. 6,532,146

Inventor: Daniel Louis Duquette

Issued: Mar. 11, 2003

A display apparatus comprises a device enclosure supporting a front panel and a monitor housing supporting a first monitor screen. The monitor housing is pivotally engaged with the device enclosure, and enabled for pivotal movement between a closed position wherein the first monitor screen is approximately parallel to the front panel, and an open position, placing the first monitor screen at an angle to the front panel. A sliding assembly supports plural further monitor screens. The further monitor screens are enabled for sliding movement between concealed positions within the monitor housing and viewing positions lateral to the monitor housing. The further monitor screens are further enabled, when placed in their viewing positions, for pivotal movement relative to the monitor assembly for improved viewing, jointly, of the plural screens.

U.S. Pat. No. 6,667,878

Inventor: David A. Ponx

Issued: Dec. 23, 2003

The instant invention is a laptop or notebook computer which employs first and second display screens coupled electronically to display identical images at the same time. The dual screen capability is ideal for business presentations, instruction and other like uses. The two screens are mechanically coupled to each other and to the computer in a manner which allows the three elements to be collapsed into a compact unit. A cover is provided to protect the second screen. The cover functions as the top of the computer when the unit is collapsed. The cover may be hinged to the second screen or may be designed to slide off.

U.S. Patent Application Publication Number 2001/0000447

Inventor: Eric Thompson

Issued: Apr. 26, 2001

A mobile computer docking mechanism which transforms a laptop computer into a fully capable desktop computing and telephony system. The invention facilitates the use of the laptop liquid crystal display screen while the laptop computer is in the docked position. The network, keyboard and power ports are connected in the docked position, and the entire desktop configuration has a very low profile taking up very little desktop space. The upright position and design facilitates proper docking and an adjustable ergonomic viewing position, elevation as well as angularity. A combination of two laptops can provide the ability to view and operate simultaneously.

U.S. Patent Application Publication Number 2002/0122290

Inventor: Chester Arthur Davis IV

Issued: Sep. 5, 2002

A notebook computer stand for a notebook computer provides a U-shaped pocket and a support. The U-shaped pocket receives the relatively thicker frame portion of the notebook computer housing the keyboard, the CPU, the mouse, and related hardware. The notebook computer's hinged display is deployed above the pocket for ease of viewing. In one embodiment, the notebook computer stand includes a storage compartment, cable slots for routing cables connected to the notebook computer, and height adjusters for varying the height of the computer stand and, indirectly, the viewing angle of the display.

International Published Application Number WO 02/082213

Inventor: Kiniko Industrial Corporation

Issued: Oct. 17, 2002

A portable computer having a monitor/keyboard module and a CPU module which can be separated from each other and selectively recombined. A dual track system allows the portable computer to be compact yet able to provide for the uncomplicated insertion and removal of six standard commercial off-the-shelf computer data storage devices. The monitor/keyboard module includes a detachable keyboard and touchpad mouse, and a monitor which is manually rotatable from an upright position to a compact position. The monitor can be locked in its compact position to ensure safe transport and to prevent anyone from easily typing or from viewing the monitor while the user is absent. Power and data communications cables are removably attached to a connector panel located on one side of the CPU module so that common computer data storage devices may be connected and disconnected exteriorly to the CPU module.

International Published Application Number WO 2005/119404

Inventor: Grant Beech

Issued: Jun. 1, 2005

The present invention provides a coupling mechanism between a primary computing device and a secondary computing device, wherein each computing device may be physically separated from each other while continuing to communicate with each other. The primary computing device has the minimum functionality of a complete computing system such as a Tablet PC<TM>, for example, and the secondary computing device has the minimum functionality of a hand-held computer monitor. The secondary computing device may also however, have the functionality of a complete computing system, or other level of functionality therebetween. The primary computing device may act as a master and control the functionality of the secondary computing device via a network or data bus connection, for example. The secondary computing device may be toggled between computer monitor functionality and secondary computer functionality regardless of whether or not the two computers are physically connected.

While these portable computers may be suitable for the purposes for which they were designed, they would not be as suitable for the purposes of the present invention, as hereinafter described.

SUMMARY OF THE PRESENT INVENTION

A primary object of the present invention is to provide a portable computer having a plurality of viewable interfaces including a dual screen viewable from multiple and opposing vantages.

Another object of the present invention is to provide a portable computer having a plurality of incorporated biometric devices including finger printing and eye scan functions.

Yet another object of the present invention is to provide a portable computer having an exterior metal structure and Teflon lined interior interface.

Still yet another object of the present invention is to provide a portable computer having an interface including but not limited to a keyboard, mouse, speakers, media ports, CD ports and touch screen capability.

Another object of the present invention is to provide a portable computer having a balance support to provided to pivotally fold to a down position or back to a closed position.

Yet another object of the present invention is to provide a portable computer having a separable monitor including a base element that displays an identical display viewable from opposing vantages.

Additional objects of the present invention will appear as the description proceeds.

The present invention overcomes the shortcomings of the prior art by providing a portable computer having a plurality of viewable interfaces including a dual screen viewable from multiple and opposing vantages that is removable from the device and is freestanding utilizing a base element. Additionally the present invention has a touch screen capability and interface elements including but not limited to a keyboard, mouse, speakers, media ports, CD ports. Finally the present invention has an exterior metal structure and Teflon lined interior interface and components for incorporated biometric devices including finger printing and eye scan functions.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the Dual Interface Portable Computer of the present invention. With regard to the reference numerals used, the following numbering is used throughout the various drawing figures.

10 Dual Interface Portable Computer of the present invention
12 computer casing
14 monitor
16 touch screen
18 user interface
20 user
22 speaker
24 GPS button
26 lapdesk support
28 camera
30 power button
32 DVD driver
34 keyboard
36 mouse
38 small media port
40 USB port
42 desk button
44 lap button
46 auxiliary button
48 RJ11 telephone and R45 network
50 battery
52 GPS module
54 video card
56 memory
58 motherboard
60 power supply 62 hard drive
64 wireless LAN
66 fan
68 external mouse
70 first display screen
72 second display screen
74 double screen base
76 laptop configuration
78 desktop configuration
80 carrying case

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
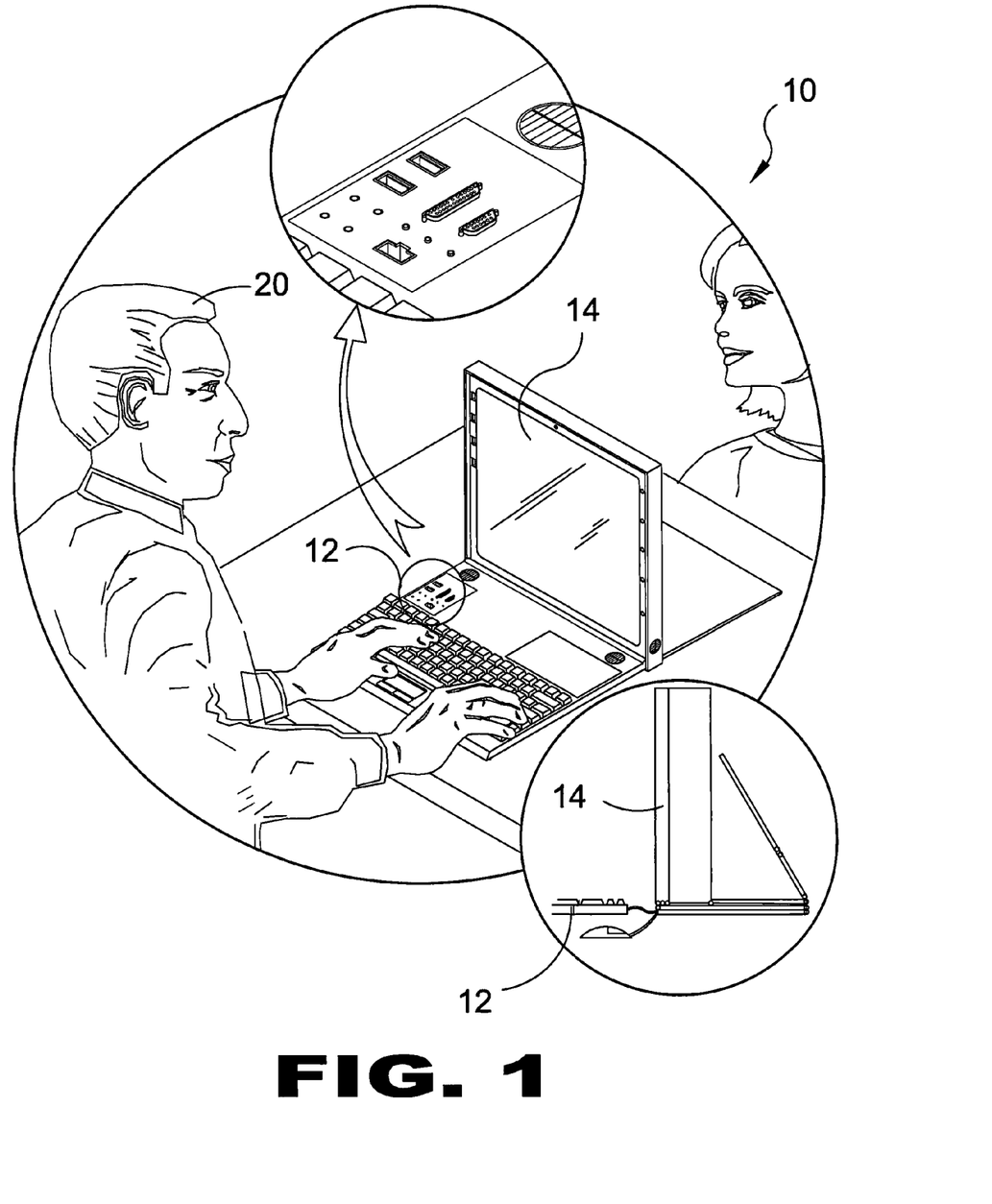
FIG. 1 is an illustrative view of the present invention in use.

FIG. 1 is an illustrative view of the present invention 10 in use. Shown is the user 20 working on the dual interface portable computer of the present invention 10 having a case 12 comprising an exterior metal with an interior Teflon liner. Said computer 10 incorporating biometric identification including fingerprint and eye scan functions. The monitor 14 is movable between various predetermined positions including horizontal and vertical. The monitor 14 detachable from the computer case 12 having a first viewable side and a second viewable side, touch screen, GPS, network router, when possible.

Figure 2:
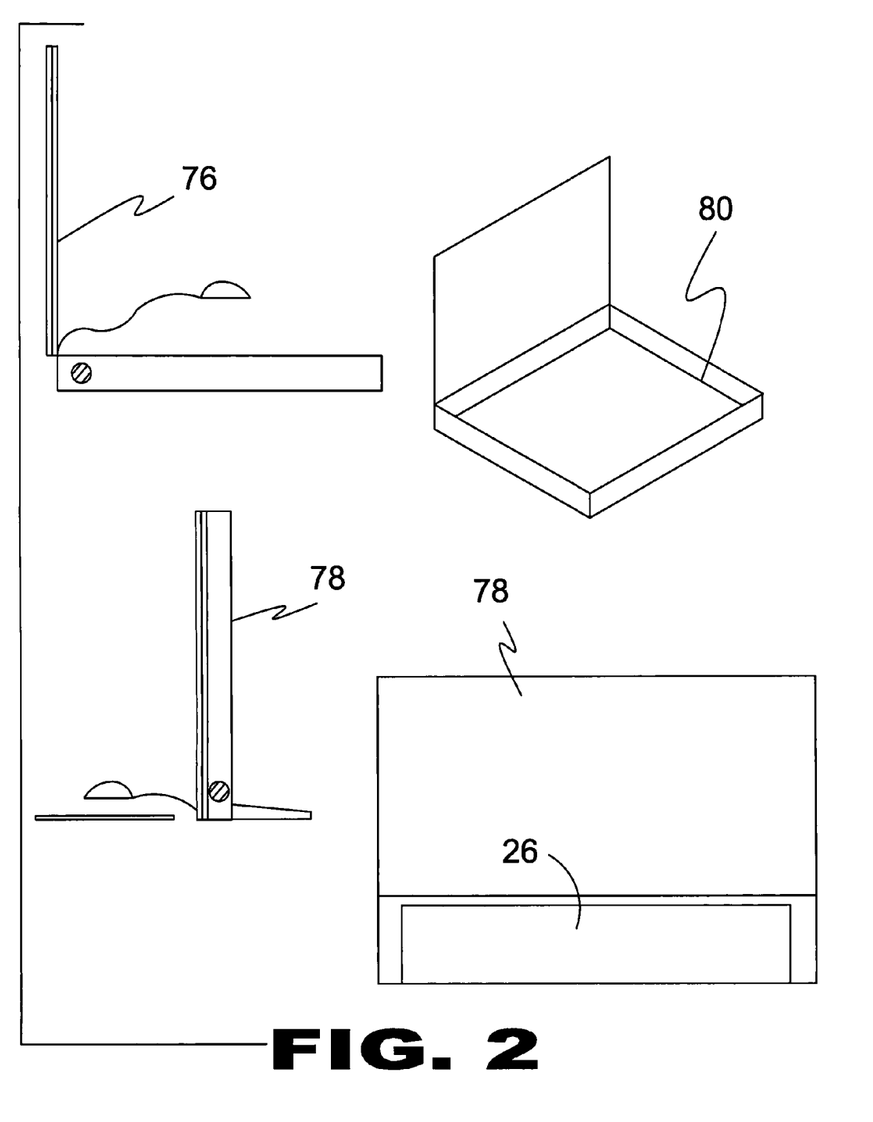
FIG. 2 is an illustrative view of the lapdesk dual interface portable-stationary computer of the present invention in a laptop and desktop configuration.

FIG. 2 is an illustrative view of the lapdesk dual interface portable-stationary computer of the present invention in a laptop and desktop configuration. As illustrated the present invention 10 can be used in its laptop configuration 78 and a desktop configuration 80 using support 26 and furthermore providing carrying case 76. Both configuration can support but are not limited to biometric identification, finger printing, touch screens, and eye scans.

Figure 3:
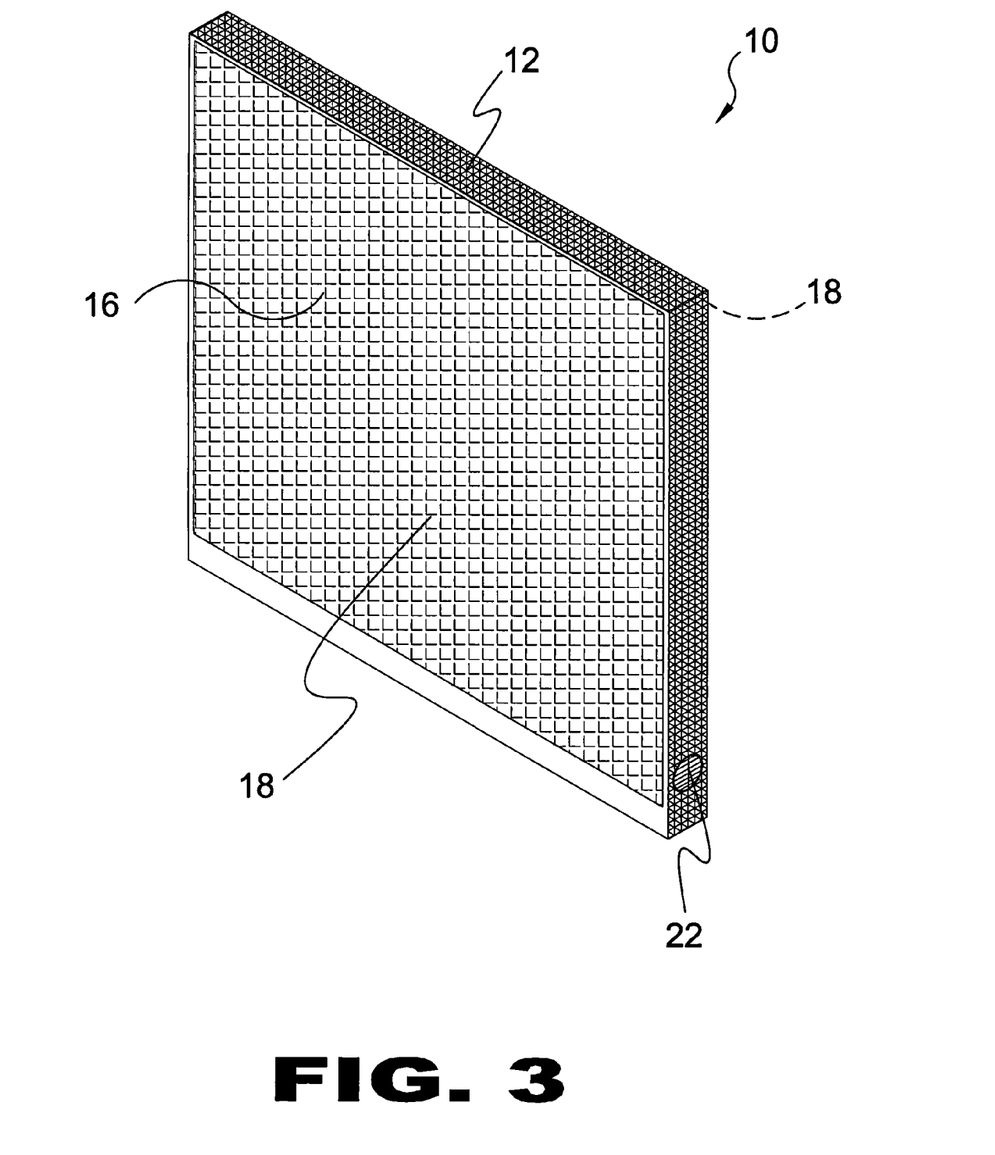
FIG. 3 is a perspective view of the present invention in the closed position.

FIG. 3 is a perspective view of the present invention 10 in the closed position having a case 12 comprising an exterior metal with an interior Teflon liner. The monitor housing is pivotally engaged with the user interface 18 which provides a keyboard, mouse, biometric identification, DVD driver and a plurality of ports. Additionally the present invention provides for speakers 22, a GPS 24 and touch screen 16.

Figure 4:
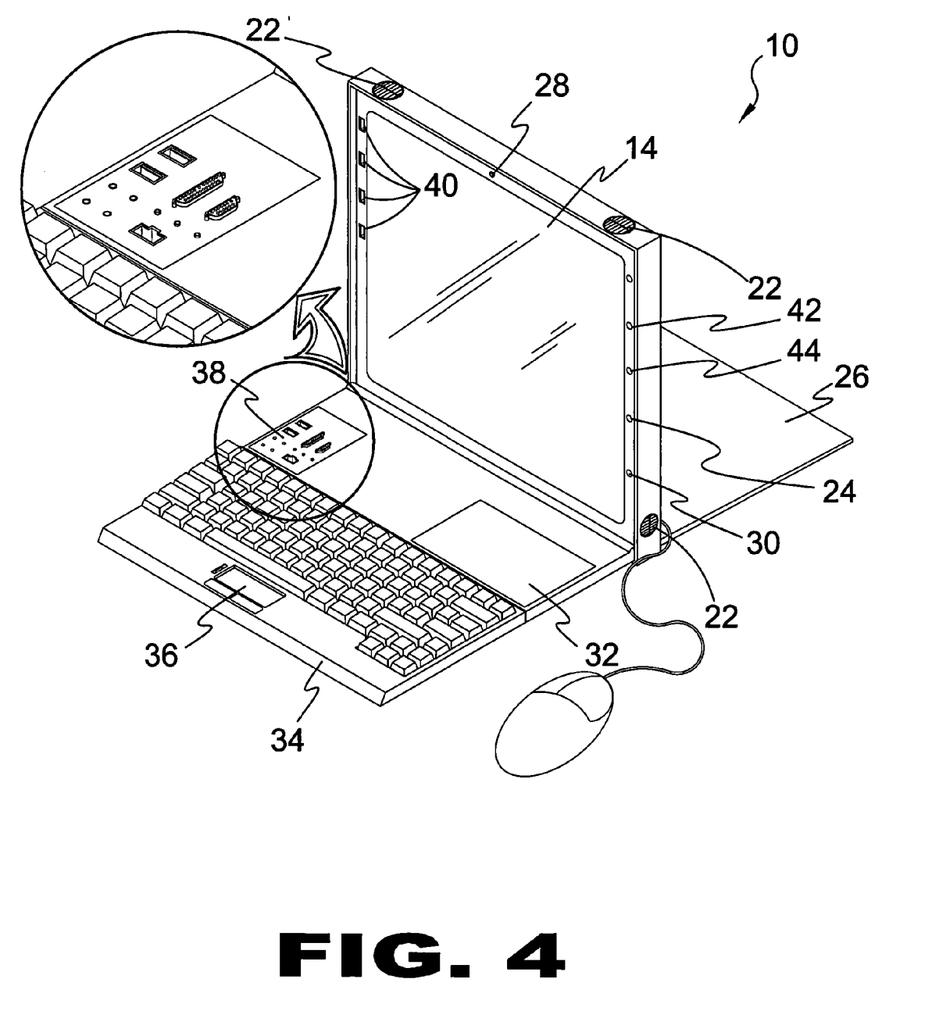
FIG. 4 is a perspective view of the present invention.

FIG. 4 is a perspective view of the present invention 10. Shown is the laptop computer of the present invention 10 having an enclosure supporting a pivotally engaged user interface comprising a keyboard 34, mousepad 36, speakers 22, small media port 38, USB ports 40, a power button 30, a desk button 42, a lap button 44, a camera 28 and a DVD driver 32. The monitor provides biometric identification including finger print and eye scan functions. A balance support 26 is provided and is pivotally folded to a down position or back to a closed position.

Figure 5:
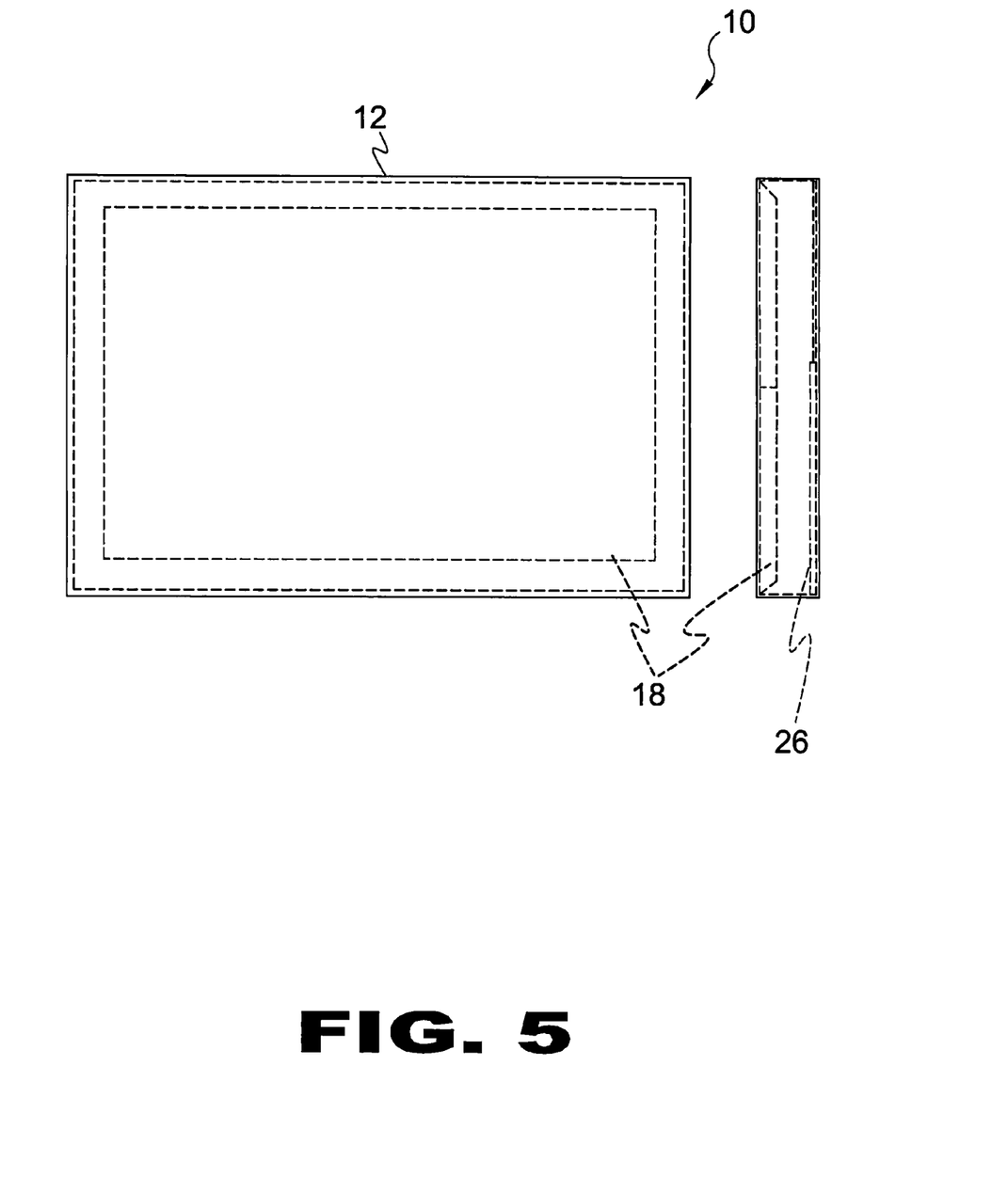
FIG. 5 is a sectional view of the present invention.

FIG. 5 is a sectional view of the present invention 10. Shown is the laptop/desktop computer of the present invention 10 having an enclosure case 12 supporting a pivotally engaged user interface 18 and a balance support 26 that is provided and is pivotally folded to a down position or back to a closed position.

Figure 6:
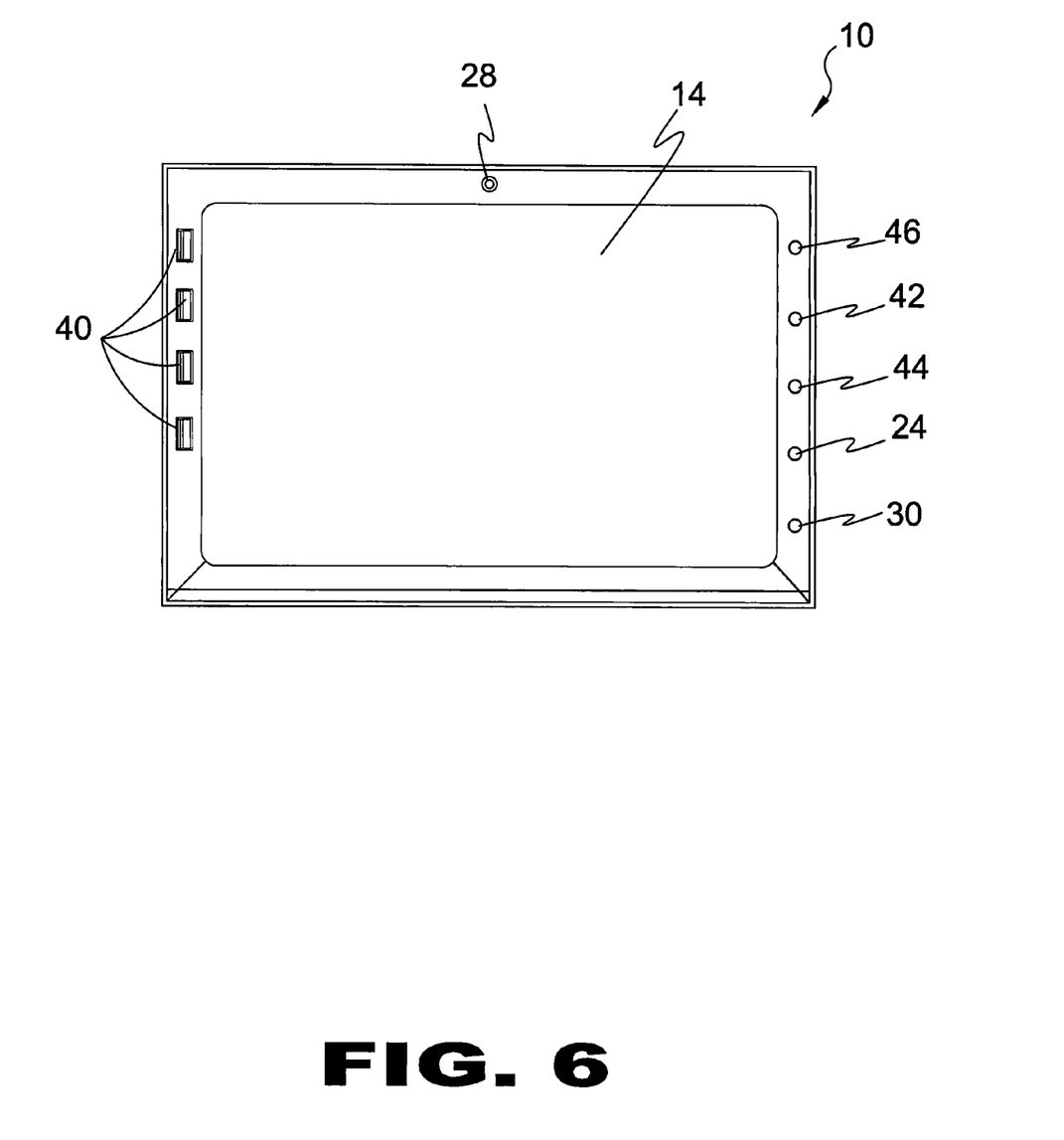
FIG. 6 is a frontal view of the monitor of the present invention.

FIG. 6 is a frontal view of the monitor of the present invention. Shown is the present invention 10 with a monitor 14 having USB ports 40, a power button 30, a desk button 42, a lap button 44, a camera 28 and a GPS 24 and an auxiliary button 46. A monitor 14 movable between various predetermined positions including horizontal and vertical. The monitor 14 detachable from the computer case having a first viewable side and a second viewable side.

Figure 7:
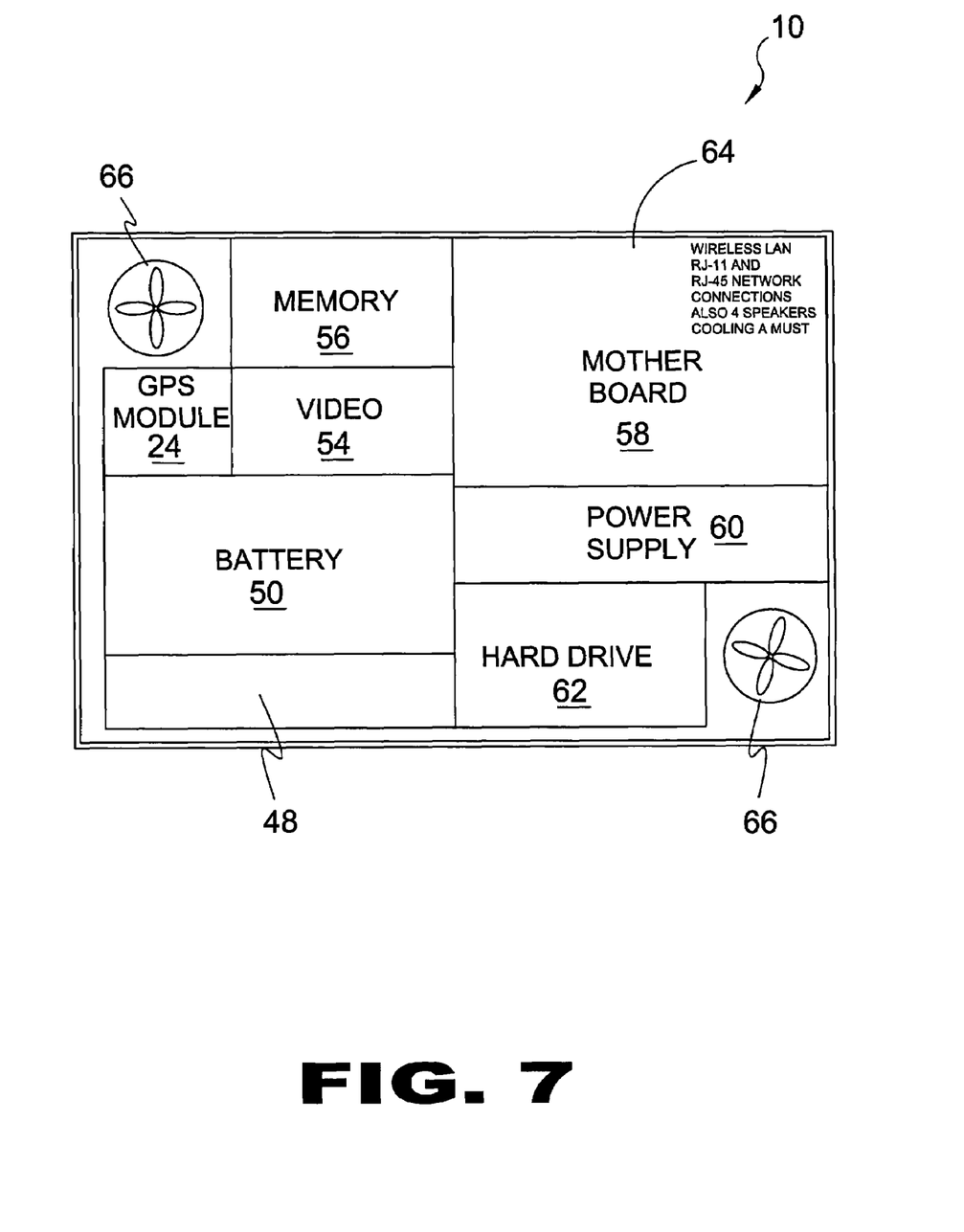
FIG. 7 is an interior view of the present invention.

FIG. 7 is an interior view of the present invention 10. Shown are the inner components that comprise the present invention 10 including an RJ11 telephone and R45 network 48, battery 50, GPS module 52, video card 54, memory 56, motherboard 58, power supply 60, hard drive 62, wireless LAN 64 and a plurality of fans 66.

Figure 8:
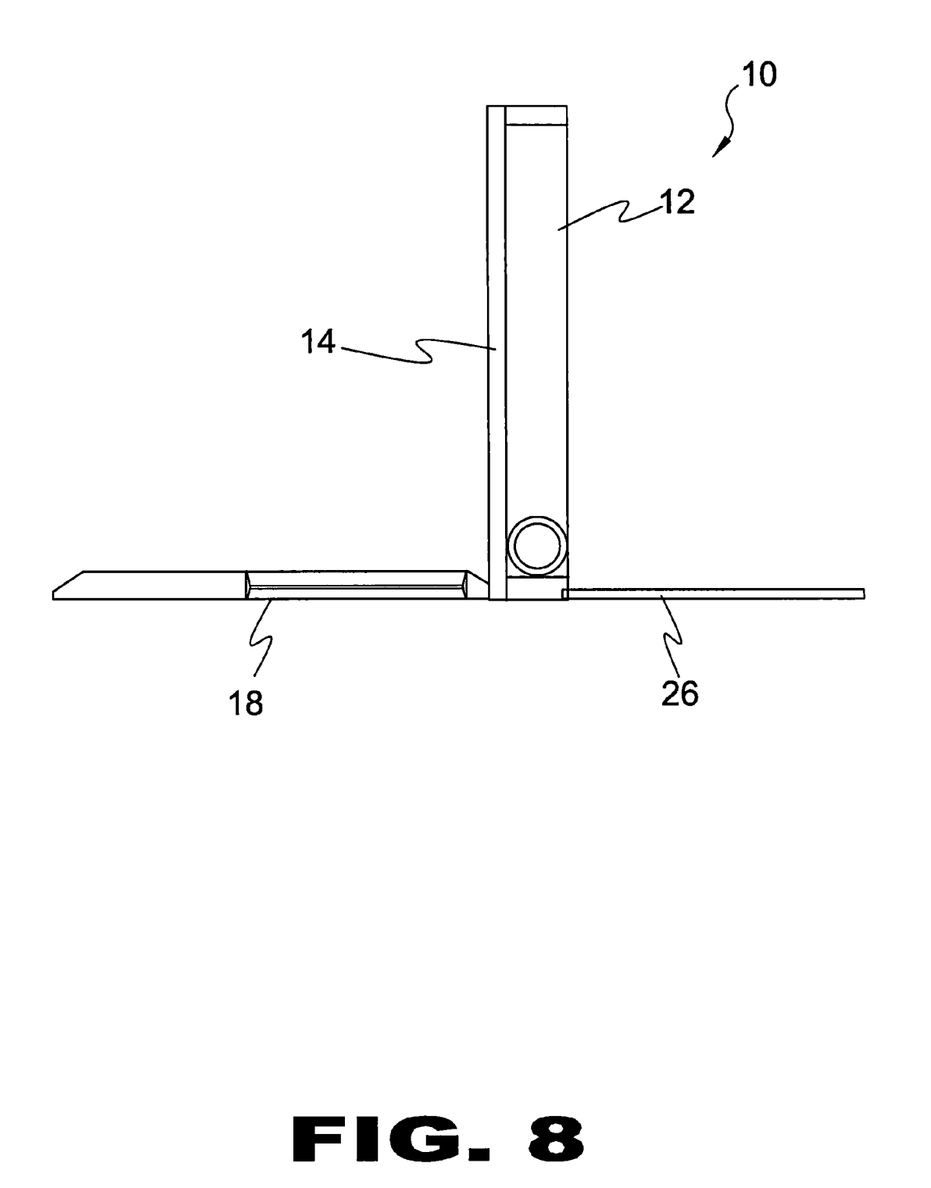
FIG. 8 is a right side view of the present invention.

FIG. 8 is a right side view of the present invention 10. Shown is the case 12 open to reveal the monitor 14, support 26 and user interface 18.

Figure 9:
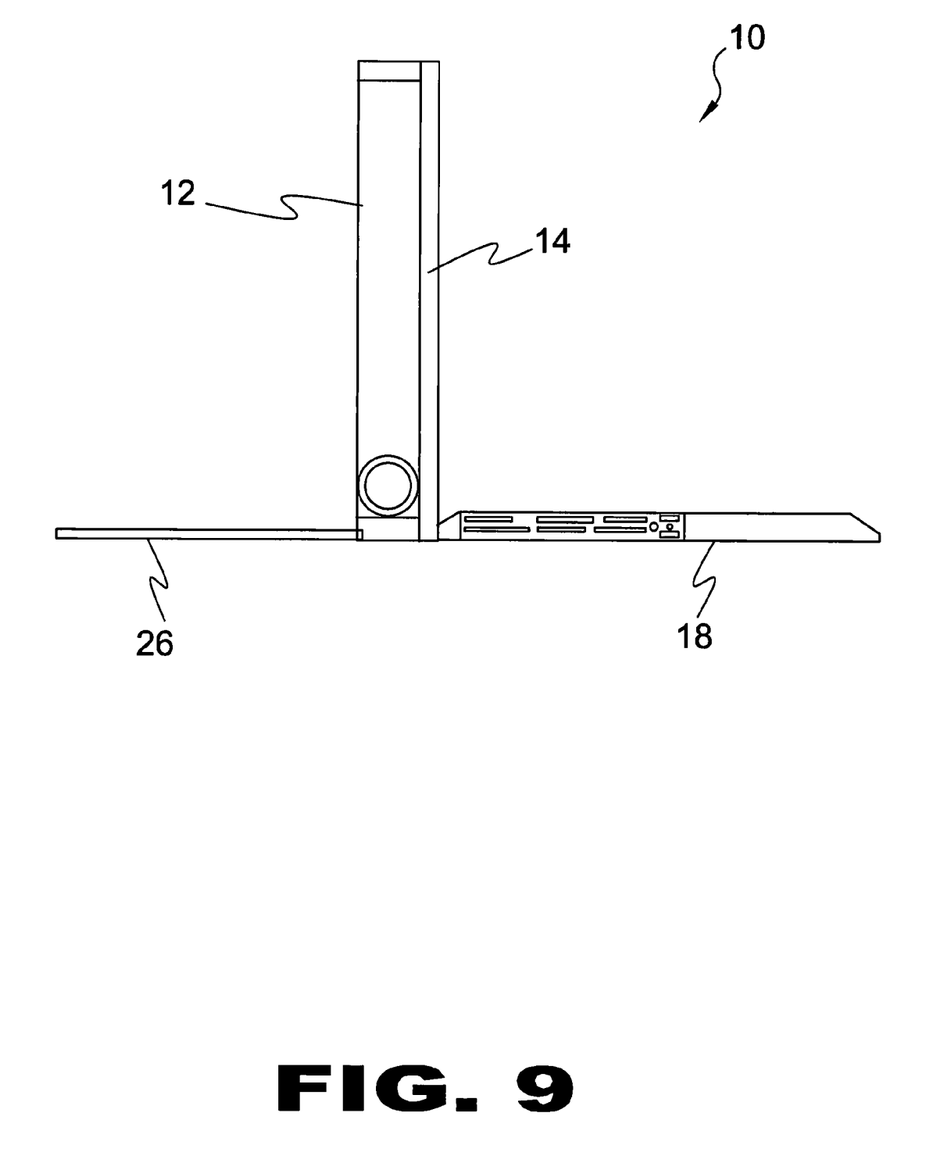
FIG. 9 is a left side view of the present invention.

FIG. 9 is a left side view of the present invention 10. Shown is the case 12 open to reveal the monitor 14, support 26 and user interface 18.

Figure 10:
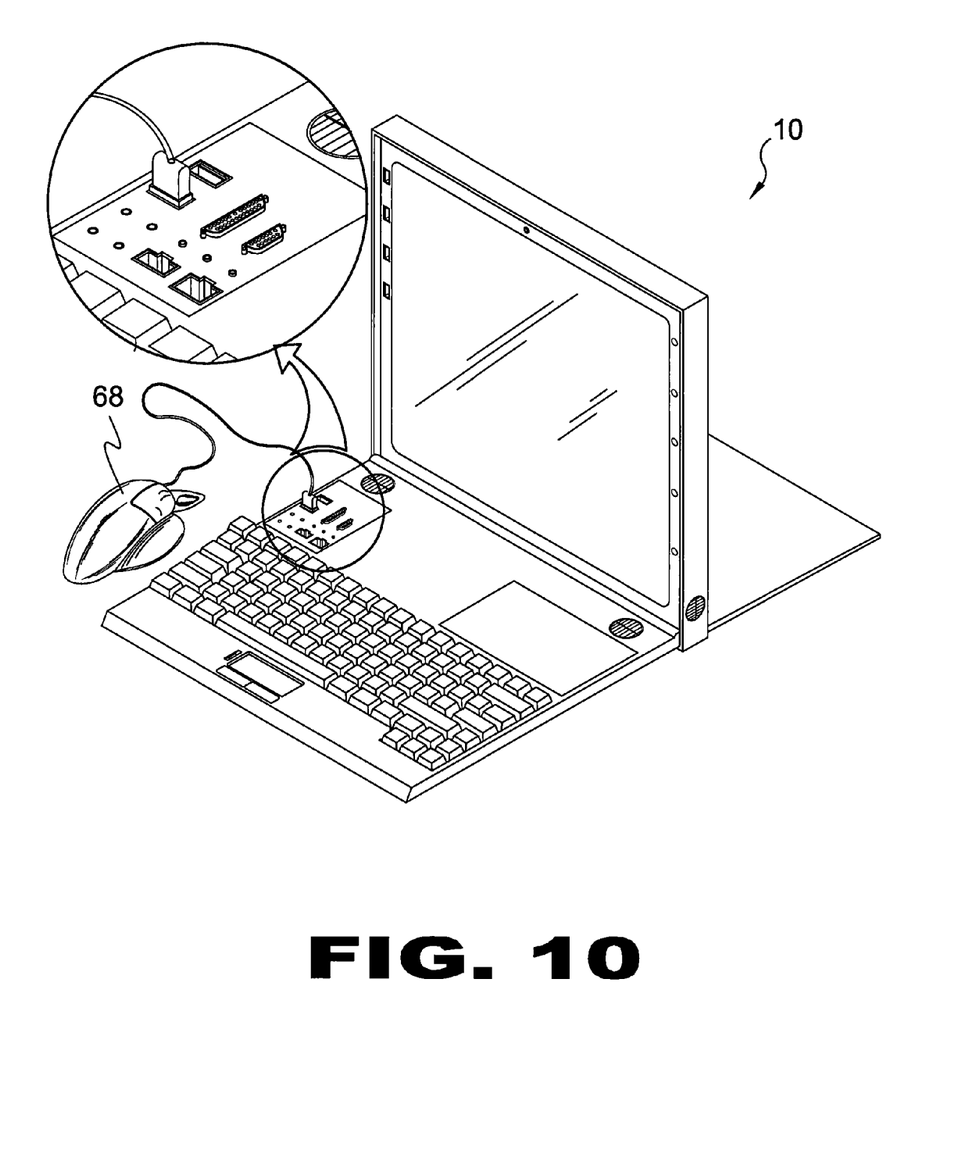
FIG. 10 is a perspective view of the present invention.

FIG. 10 is a perspective view of the present invention 10. Shown is the computer of the present invention 10 having an additional external mouse 68 attached thereto.

Figure 11:
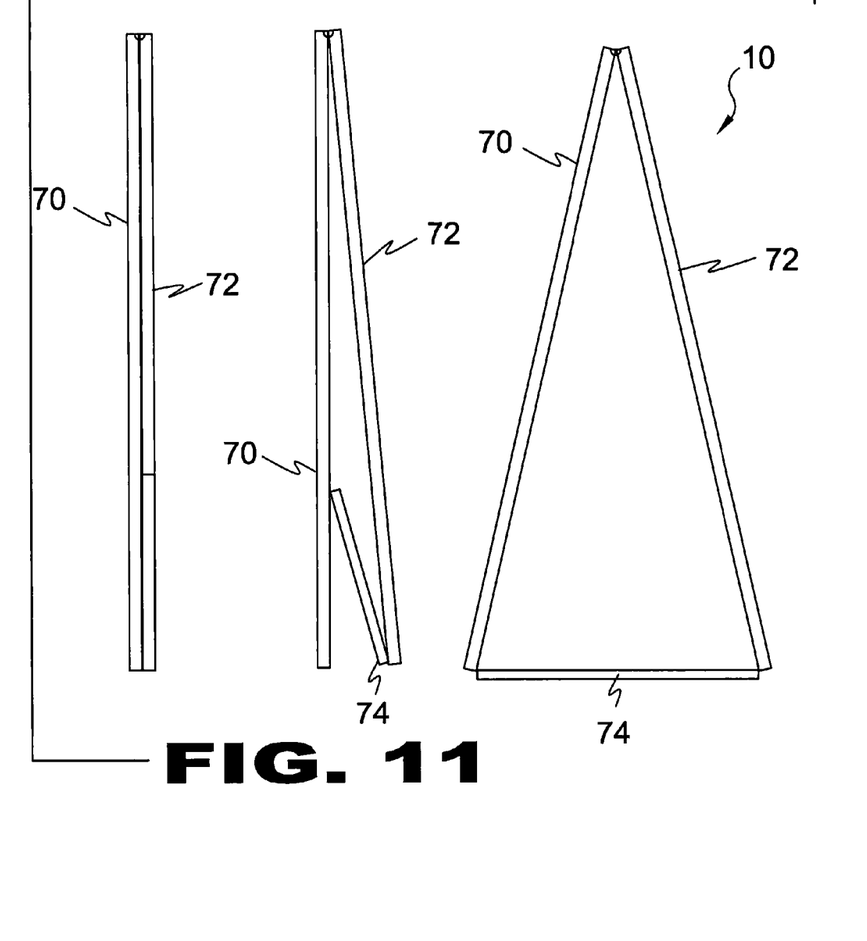
FIG. 11 is a side view of an alternate embodiment of the present invention.

FIG. 11 is a side view of an alternate embodiment of the present invention 10. Shown is a laptop computer which employs first 70 and second 72 display screens coupled electronically to display identical images at the same time and supported as such with a base member 74. The two screens are collapsible into a compact unit. The monitors are movable between various positions including horizontal and vertical.

Figure 12:
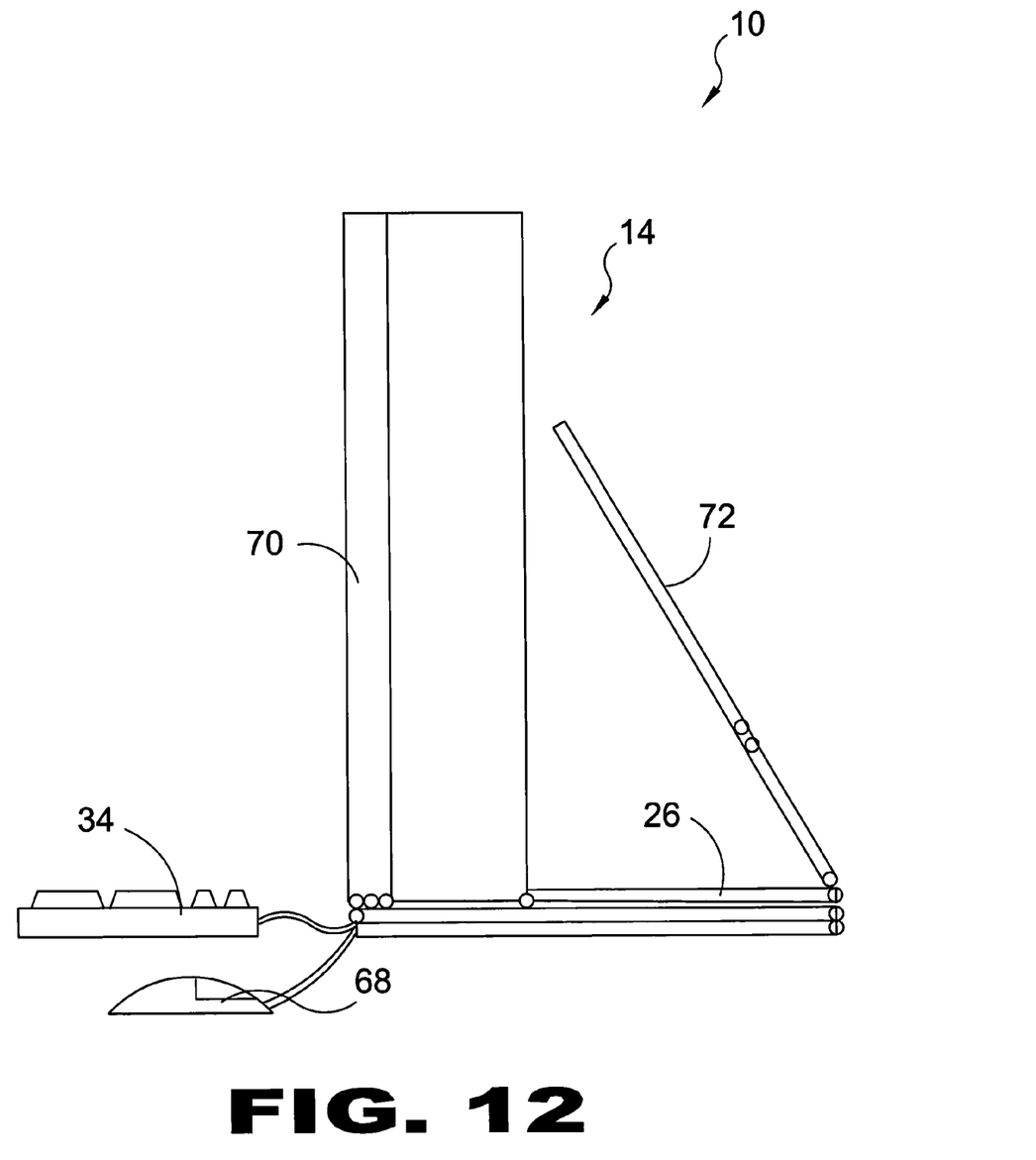
FIG. 12 is an illustrative view of the present invention in use.

FIG. 12 is an illustrative view of the present invention 10 in use. Shown is the keyboard 34 detached from the monitor 14 and the support 26 enabling both the first display screen 70 and the second 72 to be stable and viewable. An external mouse 68 is also connected thereto.

Figure 13:
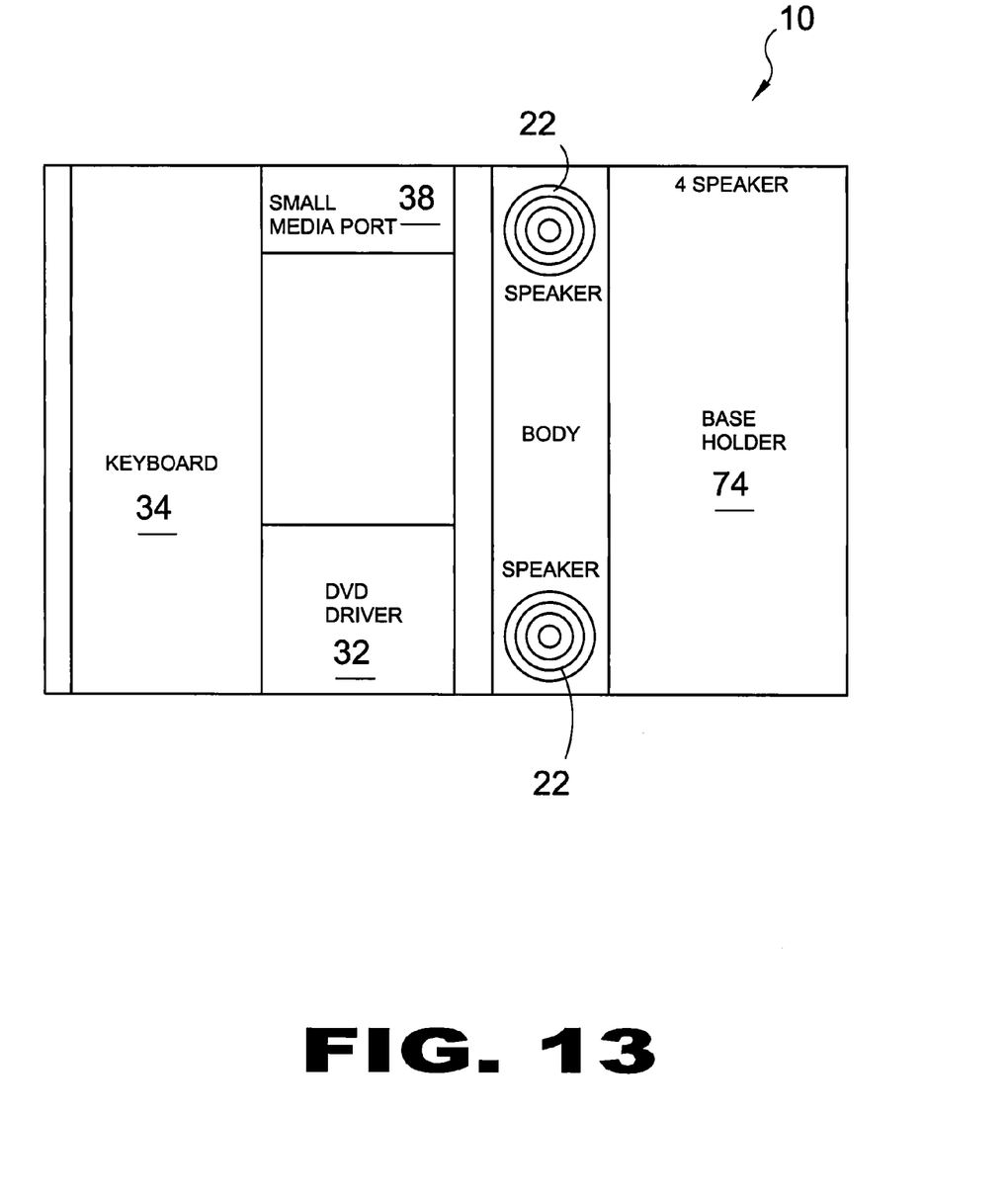
FIG. 13 is an interior view of the present invention in use as a lapdesk.

FIG. 13 is an interior view of the present invention 10 in use as a lapdesk. Shown are the internal components of the present invention 10 when functioning in the form of its lapdesk variant including speakers 22, a DVD driver 32, keyboard 34 and base 74.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A hybrid lapdesk computer capable of functioning as either a notebook or desktop computer comprising:
   a) a pivotable monitor that can be adjusted for viewing in both horizontal and vertical orientations;
   b) a detachable keyboard; and
   c) a lapdesk support that pivots flat with the underlying surface to support said monitor when said keyboard is detached therefrom;

d) said monitor has dual interface system with a first display screen and a second display screen thereby enabling users on opposing sides of said monitor to view the same image;
e) said first display screen and said second display screen are both pivotable; and
f) said first display screen and said second display screen connected and angularly adjustable by means of a double screen base seated on said lapdesk support.

2. The hybrid lapdesk computer recited in claim 1, wherein said lapdesk computer further includes user identification means to enable the user to restrict usage of said computer to unauthorized users without having to use passwords which can be breached.

3. The hybrid lapdesk computer recited in claim 2, wherein said user identification means is biometric.

4. The hybrid lapdesk computer recited in claim 3, wherein said user identification means is a retinal scan taken by a camera disposed on said monitor.

5. The hybrid lapdesk computer recited in claim 3, wherein said user identification means is fingerprint recognition recognized by placing the fingertips against a touch screen portion of said monitor.

6. The hybrid lapdesk computer recited in claim 1, wherein said computer further includes a GPS module.

7. The hybrid lapdesk computer recited in claim 1, wherein said computer further includes an RJ11 telephone with R45 network to enable dial-up.

8. The hybrid lapdesk computer recited in claim 1, wherein said computer includes a wireless LAN card.

9. The hybrid lapdesk computer recited in claim 1, wherein said monitor has user controls for switching between use as a laptop notebook or a desktop computer.

10. The hybrid lapdesk computer recited in claim 1, wherein said computer has a mousepad disposed on said keyboard.

11. The hybrid lapdesk computer recited in claim 10, wherein said computer further includes a plurality of USB ports.

12. The hybrid lapdesk computer recited in claim 1, wherein said computer is disposed within a sturdy metal case.

13. The hybrid lapdesk computer recited in claim 12, wherein said case has a Teflon liner to protect the adjacent components disposed therein.

14. A dual interface portable computer comprising:
a) computer components disposed beneath a keyboard;
b) a monitor having a first display screen and a second display screen viewable from the opposing side thereof and detachable from said keyboard;
c) a pivotable surface support for retaining said monitor in a selected position when detached from said keyboard;
d) biometric recognition means for identifying the user and authorizing access to enable functions of said computer;
e) a GPS module disposed therein;
f) each said display screen is pivotable between horizontal and vertical positions; and
g) said first display screen and said second display screen connected and angularly adjustable by means of a double screen base seated on said pivotal surface support.

15. The dual interface portable computer recited in claim 14, wherein each said display screen has touch screen capabilities.

\* \* \* \* \*